(12) United States Patent
Kim et al.

(10) Patent No.: US 10,895,798 B2
(45) Date of Patent: Jan. 19, 2021

(54) BEAM DEFLECTOR, HOLOGRAPHIC DISPLAY DEVICE HAVING THE SAME, AND METHOD OF DRIVING THE BEAM DEFLECTOR

(71) Applicants: SAMSUNG ELECTRONICS CO., LTD., Suwon-si (KR); SOGANG UNIVERSITY RESEARCH FOUNDATION, Seoul (KR)

(72) Inventors: Young Kim, Yongin-si (KR); Kanghee Won, Seoul (KR); Himchan Park, Seoul (KR); Jinwook Burm, Seoul (KR); Hoon Song, Yongin-si (KR); Hongseok Lee, Seoul (KR)

(73) Assignees: SAMSUNG ELECTRONICS CO., LTD., Suwon-si (KR); SOGANG UNIVERSITY RESEARCH FOUNDATION, Seoul (KR)

( * ) Notice: Subject to any disclaimer, the term of this patent is extended or adjusted under 35 U.S.C. 154(b) by 59 days.

(21) Appl. No.: 16/121,392

(22) Filed: Sep. 4, 2018

(65) Prior Publication Data
US 2019/0331980 A1  Oct. 31, 2019

(30) Foreign Application Priority Data
Apr. 30, 2018  (KR) .......................... 10-2018-0050179

(51) Int. Cl.
*G02F 1/29*  (2006.01)
*G03H 1/00*  (2006.01)

(52) U.S. Cl.
CPC ............. *G02F 1/29* (2013.01); *G03H 1/0005* (2013.01); *G03H 2001/0088* (2013.01); *G03H 2223/18* (2013.01)

(58) Field of Classification Search
None
See application file for complete search history.

(56) References Cited

U.S. PATENT DOCUMENTS

| | | | |
|---|---|---|---|
| 7,599,036 B2 | 10/2009 | Ito | |
| 7,832,883 B2 | 11/2010 | Ronda et al. | |
| 7,852,445 B2 | 12/2010 | Uehara et al. | |
| 10,585,330 B2 | 3/2020 | Kim et al. | |
| 2017/0269453 A1* | 9/2017 | Galstian | G02F 1/1337 |

(Continued)

FOREIGN PATENT DOCUMENTS

| | | |
|---|---|---|
| JP | 2004-354407 A | 12/2004 |
| JP | 4822535 B2 | 11/2011 |
| JP | 4952063 B2 | 6/2012 |

(Continued)

*Primary Examiner* — Phu Vu
(74) *Attorney, Agent, or Firm* — Sughrue Mion, PLLC

(57) ABSTRACT

A beam deflector, a holographic display device including the beam deflector, and a method of driving the beam deflector are provided. The beam deflector includes first electrodes spaced apart from each other on a first substrate, second electrodes spaced apart from each other on a second substrate, a liquid crystal layer between the first substrate and the second substrate, and a controller configured to cause active prisms to be formed in the liquid crystal layer and to form a floating zone by turning off a voltage of at least one of the first electrode and the second electrode disposed between adjacent ones of the active prisms.

15 Claims, 14 Drawing Sheets

(56) References Cited

U.S. PATENT DOCUMENTS

2018/0129105 A1  5/2018  Kim et al.

FOREIGN PATENT DOCUMENTS

| | | |
|---|---|---|
| JP | 2016-170263 A | 9/2016 |
| KR | 10-2012-0040796 A | 4/2012 |
| KR | 10-1189297 A | 10/2012 |
| KR | 10-2013-0053652 A | 5/2013 |
| KR | 10-2016-001808 A | 1/2016 |
| KR | 10-2019-0018937 A | 2/2019 |

* cited by examiner

BEAM DEFLECTOR, HOLOGRAPHIC DISPLAY DEVICE HAVING THE SAME, AND METHOD OF DRIVING THE BEAM DEFLECTOR

CROSS-REFERENCE TO RELATED APPLICATION

This application claims priority from Korean Patent Application No. 10-2018-0050179, filed on Apr. 30, 2018, in the Korean Intellectual Property Office, the disclosure of which is incorporated herein in its entirety by reference.

BACKGROUND

1. Field

Apparatuses and methods consistent with example embodiments relate to a beam deflector, a holographic display device having the same, and a method of driving the beam deflector.

2. Description of the Related Art

A holographic display device displays a clear depth 3D image without creating eye fatigue, and is considered to be the ultimate three-dimensional (3D) display. However, a holographic display device requires a high-resolution spatial light modulator (SLM) with wavelength-sized pixels and a coherent surface light source. Furthermore, an enormous computational amount is necessary to create a computer generated hologram (CGH).

In recent years, a binocular hologram method has been proposed to provide a hologram image only to viewing areas corresponding to the eyes of an observer and thus address data throughput and resolution problems. For example, only a hologram image having a viewpoint corresponding to an observer's left eye viewing area and a hologram image having a viewpoint corresponding to an observer's right eye viewing area may be generated and provided to observer's left eye and right eye, respectively. In this case, since hologram images with respect to the remaining viewpoints are not necessarily generated, the data throughput may be greatly reduced, and the resolution condition of a spatial light modulator may be satisfied even in a currently commercialized display device.

To implement a display using this method, a beam including an image of a corresponding viewpoint must be transmitted to a binocular position of an observer. A beam deflector may be used to deflect a holographic image. The beam deflector may include a beam deflection panel capable of changing a traveling direction of light with an electrical signal. Examples of the beam deflector include a microelectromechanical systems (MEMS) scanner, a galvano mirror, a linear spatial light modulator (SLM), a liquid crystal beam deflector, etc.

SUMMARY

One or more example embodiments may provide beam deflectors that deflect a beam according to a location of a viewer.

One or more example embodiments may provide holographic display devices including beam deflectors that deflect a beam according to a location of a user.

One or more example embodiments may provide methods of driving beam deflectors.

Additional example aspects and advantages will be set forth in part in the description which follows and, in part, will be apparent from the description, or may be learned by practice of the presented embodiments.

According to an aspect of an example embodiment, a beam deflector includes a first substrate; a first electrode layer including first electrodes spaced apart from each other on the first substrate; a second substrate facing the first substrate; a second electrode layer including second electrodes spaced apart from each other on the second substrate; a liquid crystal layer between the first substrate and the second substrate and including active prisms varying according to a voltage applied between the first electrode layer and the second electrode layer; and a controller configured to change the active prisms by adjusting the voltage applied between the first electrodes and the second electrodes and form a floating zone by turning off a voltage of at least one of the first electrodes and the second electrodes between adjacent ones of the active prisms.

Each of the first electrodes and each of the second electrodes may be configured to be driven independently.

The control unit may be configured to apply sequentially increasing or decreasing voltages to n consecutive ones of the first electrodes and apply a common reference voltage to n consecutive ones of the second electrodes corresponding to the n consecutive ones of the first electrodes.

A voltage may be turned off on at least one of a first electrode positioned next to the n consecutive ones of the first electrodes and a second electrode positioned next to the n consecutive ones of the second electrodes.

The control unit may be configured to control a deflection angle of a beam incident on the beam deflector by an active prism by adjusting a number of the n consecutive ones of the first electrodes and a number of the n consecutive ones of the second electrodes corresponding to the first electrodes.

The first electrodes and the second electrodes may include line electrodes spaced apart from and in parallel to each other.

The controller may be configured to reset an orientation of liquid crystal molecules of the liquid crystal layer by applying voltages between adjacent ones of the first electrodes in the first electrode layer and by applying a common reference voltage to the second electrodes of the second electrode layer before converting the active prisms.

The controller may be configured to reset an orientation of liquid crystal molecules of the liquid crystal layer by applying voltages between adjacent ones of the first electrodes in the first electrode layer and by applying voltages between adjacent ones of the second electrodes of the second electrode layer before converting the active prisms.

According to an aspect of another example embodiment, a holographic display device includes a light source; a beam deflector configured to deflect a beam received from the light source; and a spatial light modulator configured to diffract the beam deflected by the beam deflector to form a hologram image, wherein the beam deflector includes a first substrate; a first electrode layer including first electrodes spaced apart from each other on the first substrate; a second substrate facing the first substrate; a second electrode layer including second electrodes spaced apart from each other on the second substrate; a liquid crystal layer between the first substrate and the second substrate and including active prisms varying according to a voltage applied between the first electrode layer and the second electrode layer; and a controller configured to change the active prisms by adjusting voltages between the first electrodes and the second electrodes and form a floating zone by turning off a voltage of at least one of the first electrodes and the second electrodes between adjacent ones of the active prisms.

The beam deflector may further include a position detection sensor configured to detect a position of a viewer viewing the hologram image.

According to an aspect of another example embodiment, a method of driving a beam deflector includes applying voltages independently to first electrodes spaced apart from each other on a first substrate; applying voltages independently to second electrodes spaced apart from each other on a second substrate facing the first substrate; converting active prisms formed in a liquid crystal layer disposed between the first substrate and the second substrate by adjusting the voltages between the first electrodes and the second electrodes; and resetting an orientation of liquid crystal molecules of the liquid crystal layer by applying voltages to adjacent ones of the first electrodes and applying voltages to adjacent ones of the second electrodes before converting the active prisms.

BRIEF DESCRIPTION OF THE DRAWINGS

These and/or other example aspects and advantages will become apparent and more readily appreciated from the following description of the embodiments, taken in conjunction with the accompanying drawings in which.

DETAILED DESCRIPTION

Figure 1:
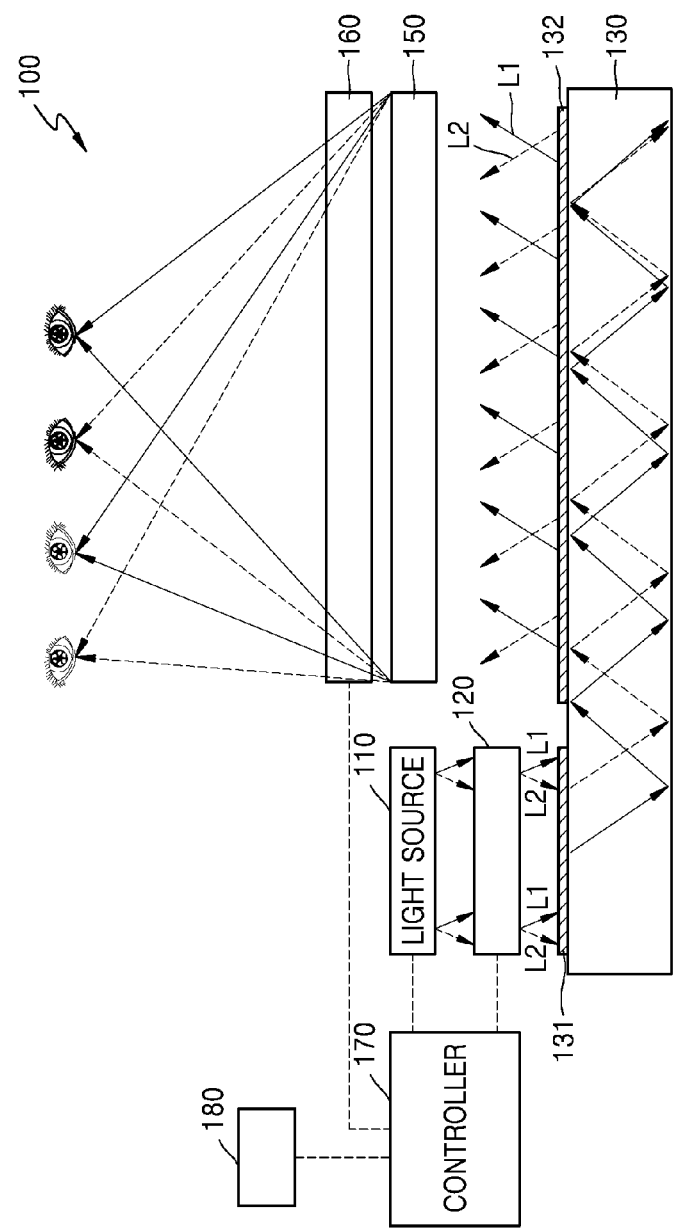
FIG. 1 is a cross-sectional view showing a schematic structure of a holographic display device according to an example embodiment.

Reference will now be made in detail to example embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

A beam steering device and a system including the beam steering device according to various example embodiments will now be described more fully with reference to the accompanying drawings. In the drawings below, like reference numerals denote like elements, and sizes of components in the drawings may be exaggerated for clarity and convenience of explanation. While terms "first" and "second" are used to describe various components, it is obvious that these components are not limited by the terms "first" and "second". The terms "first" and "second" are used only to distinguish between each component.

Singular expressions, unless defined otherwise in contexts, include plural expressions. Also, when a part "includes" an element, unless there is a particular description contrary thereto, the part can further include other elements, not excluding the other elements. In the drawings, the sizes or thicknesses of elements may be exaggerated for clarity. When a predetermined material layer is described as being on a substrate or another layer, the material can be directly on or directly contact the substrate or the other layer, or intervening layers be present. In addition, materials of each layer in example embodiments described below are examples, and other materials may also be used.

FIG. 1 is a cross-sectional view showing a schematic structure of a holographic display device 100 according to an example embodiment.

The holographic display device 100 may include a light source 110 providing a beam, a beam deflector 120 deflecting the beam output from the light source 110, a controller 170 controlling a direction of deflection of the beam in the beam deflector 120, and a spatial light modulator 160 diffracting the incident beam to form a hologram image. The holographic display device 100 may further include a light guide plate 130 guiding the beam, deflected by the beam deflector 120, toward the spatial light modulator 160 and a field lens 150 focusing the hologram image onto a predetermined space. The holographic display device 100 may further include a position detection sensor 180 tracking a position of a viewer.

The light source 110 may be a coherent light source that emits coherent light in any of a plurality of wavelength bands. In an example embodiment, the light source 110 may be a laser diode (LD) that provides light with high coherence. In another example embodiment, since light may be diffracted and modulated by the spatial light modulator 160 when the light has some degree of spatial coherence, the light source 110 may be a light emitting diode (LED). Any other light source may be used which emits light having spatial coherence. The light source 110 may include a plurality of point light source arrays although the light source 100 is shown as only one block in FIG. 1 for convenience. In an example embodiment, the light source 110 may include a plurality of red emission lasers, a plurality of green emission lasers, and a plurality of blue emission lasers.

The beam deflector 120 may deflect a beam from the light source 110. In an example embodiment, L1 and L2 may be beams to be directed to a left eye and a right eye, respectively. To form L1 and L2, an incident beam may be deflected, sequentially, in two directions under the control of the controller 170, or may be simultaneously deflected in two directions.

The light guide plate 130 may include transparent glass or transparent plastic. In an example embodiment, the light guide plate 130 may include PMMA (PolyMethyl Methacrylate). The light guide plate 130 may have a rectangular parallelepiped shape and serve as an optical waveguide transmitting a beam. A beam incident on one end of the light guide plate 130 may be transmitted to the opposite end through total internal reflection.

The spatial light modulator 160 may form a hologram pattern and modulate an incident beam according to a hologram signal provided from an image signal processor (not shown). As the spatial light modulator 160, any of a phase modulator capable of performing only phase modulation, an amplitude modulator capable of performing only amplitude modulation, and a complex modulator capable of performing both phase modulation and amplitude modulation may be used. Although the spatial light modulator 160 is shown as a transmission type spatial light modulator in FIG. 1, a reflection type spatial light modulator may also be used. In the case of a transmission type spatial light modulator, the spatial light modulator 160 may include, in an example embodiment, a semiconductor modulator based on a compound semiconductor such as GaAs, or a liquid crystal device (LCD). In the case of a reflection type spatial light modulator, the spatial light modulator 160 may use, according to an example embodiment, a digital micromirror device (DMD), a liquid crystal on silicon (LCoS), or a semiconductor modulator.

The beam of the light source 110 may be deflected by the beam deflector 120 and then guided by the light guide plate 130 and expanded by transmission through the field lens 150 to a size corresponding to the spatial light modulator 160. The light guide plate 130 may be further provided with an input coupler 131, allowing the beam deflected by the beam deflector 120 to be incident into the light guide plate 130, and an output coupler 132, outputting the beam, traveling in the light guide plate 130 by total internal reflection.

The directional beam emitted from the light guide plate 130 may be incident on the spatial light modulator 160 through the field lens 150. The spatial light modulator 160 may form a hologram pattern having an interference pattern which modulates the incident beam. The incident beam may be diffracted and modulated by the hologram pattern formed by the spatial light modulator 160 such that the hologram image may be reproduced at a predetermined spatial position. A left eye hologram image may be reproduced in a left eye position, and a right eye hologram image may be reproduced in a right eye position.

The position detection sensor 180 may track a position of a viewer and transmit the position of the viewer to the controller 170. The controller 170 may control the beam deflector 120 according to the position of the viewer such that the beam is directed to viewer's eyes.

Figure 2:
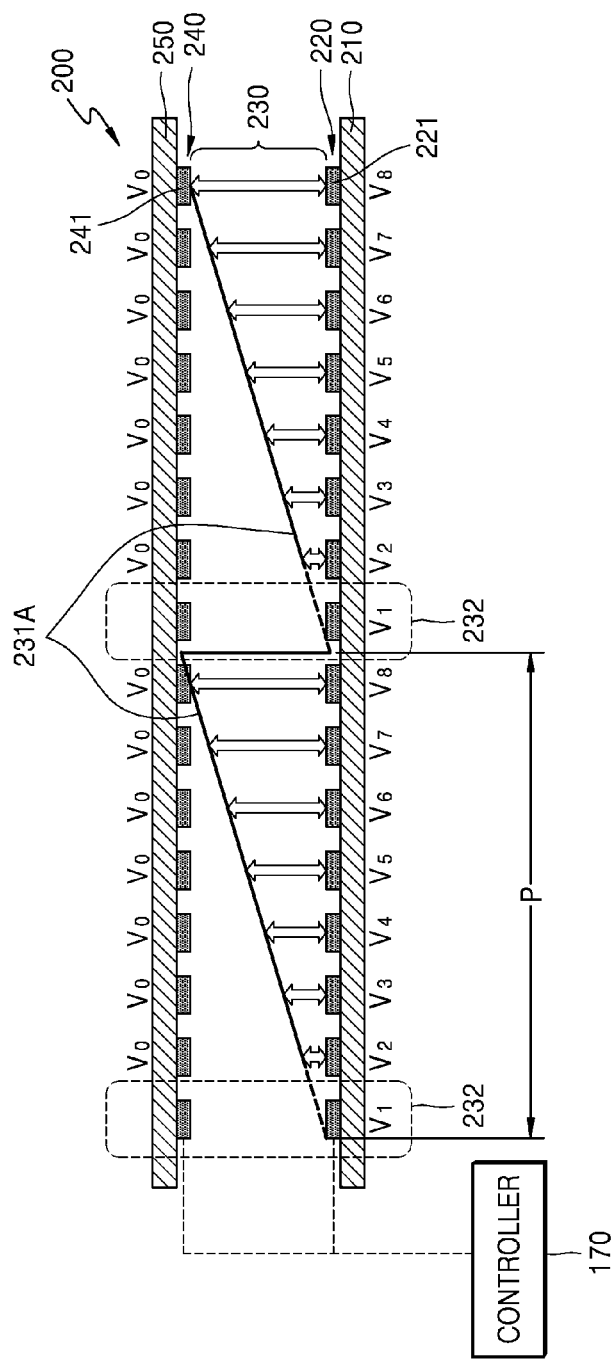
FIG. 2 schematically illustrates a beam deflector according to an example embodiment.

FIG. 2 schematically illustrates a beam deflector 200 according to an example embodiment.

The beam deflector 200 may include a first substrate 210, a first electrode layer 220 including first electrodes 221 spaced apart from each other on the first substrate 210, a second substrate 250 arranged to face the first substrate 210, a second electrode layer 240 including second electrodes 241 spaced apart from each other on the second substrate 250, and a liquid crystal layer 230 provided between the first substrate 210 and the second substrate 250.

The first substrate 210 and the second substrate 250 may be insulating substrates and may include glass or transparent plastic.

The first electrodes 221 and the second electrodes 241 may be independently driven. The liquid crystal layer 230 may include an active prism array 231A formed by a change in the arrangement of liquid crystal molecules according to an electric field formed between the first electrode layer 220 and the second electrode layer 240. The active prism array 231A may have a structure in which a plurality of active prisms 231 are linearly arranged. The active prism array 231A may include a floating zone 232 between neighboring ones of the active prisms 231. The floating zone 232 may be a zone in which a voltage is turned off. An arrangement pitch P of the active prisms 231 varying according to voltages applied to the first and second electrodes 221 and 241 may change in the active prism array 231A. This will be described later.

Figure 3:
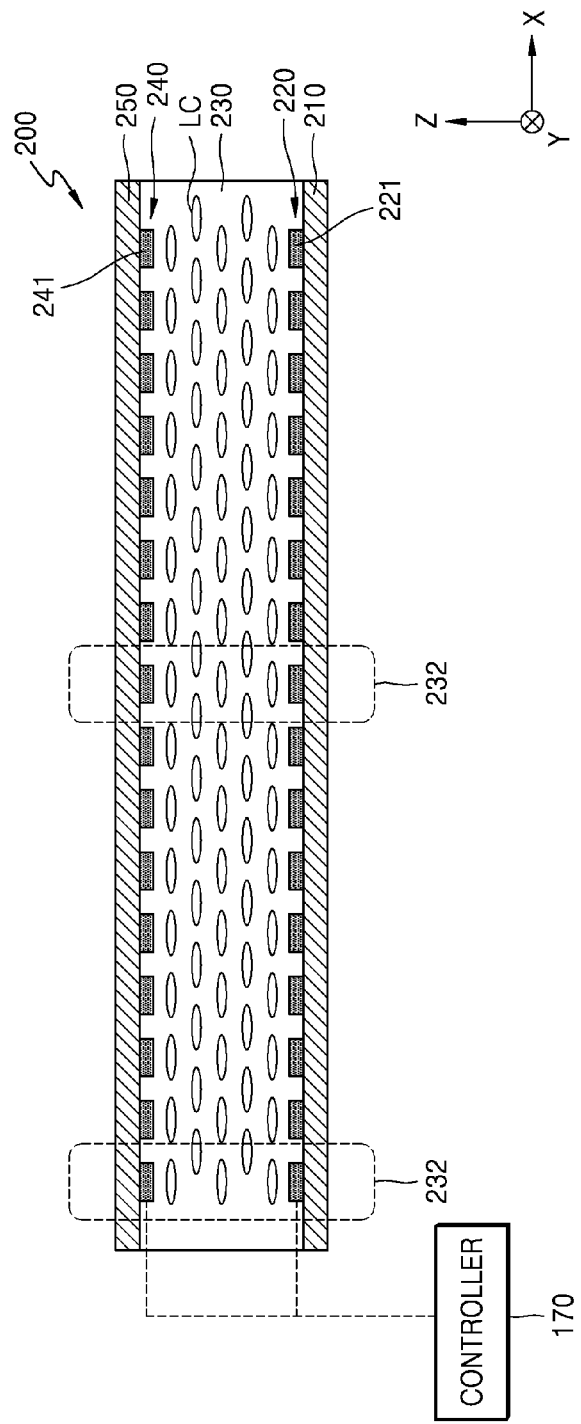
FIG. 3 shows an electric field off mode in which no electric field is formed since no voltage is applied to a beam deflector according to an example embodiment.
Figure 4:
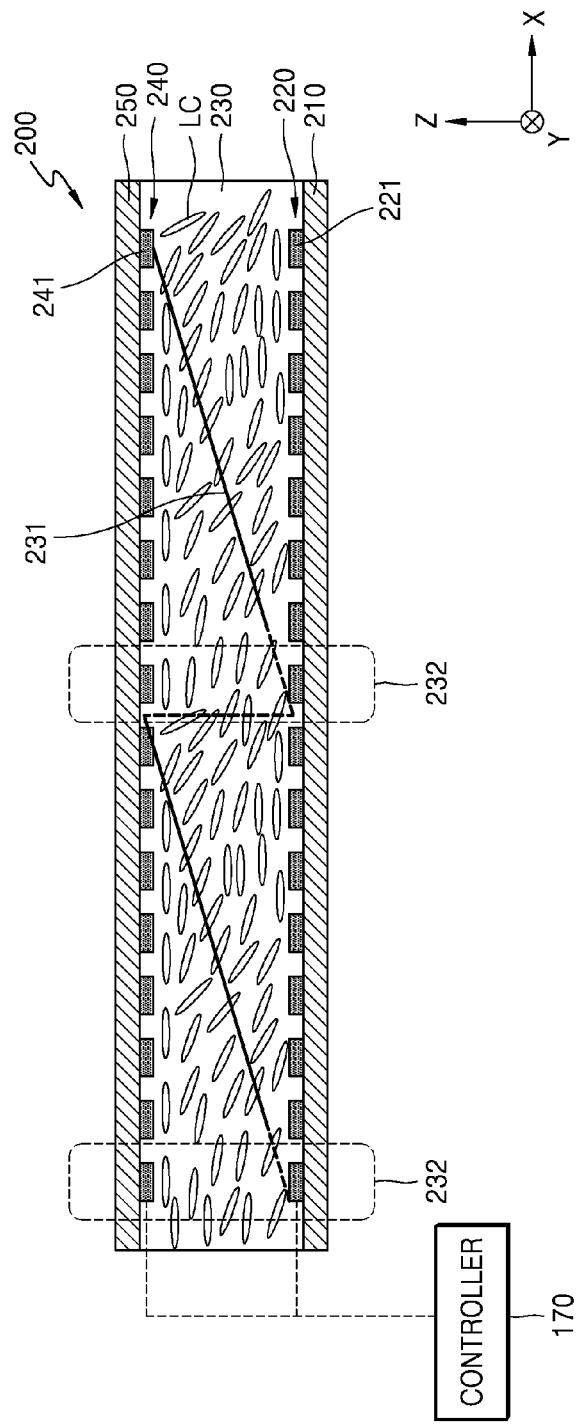
FIG. 4 shows an electric field on mode in which an electric field is formed since a voltage is applied to a beam deflector according to an example embodiment.

FIGS. 3 and 4 are conceptual diagrams illustrating a principle of forming an active prism in the beam deflector 200 according to an example embodiment.

The first electrodes 221 may have a line shape extending in one direction, for example, a y direction, and may be arranged in parallel with one another along an x direction. The second electrodes 241 may have a line shape extending in one direction, for example, the y direction, and may be arranged in parallel with another along the x direction. The first electrodes 221 and the second electrodes 241 may be arranged in parallel to face each other. Voltages may be independently applied to each of the first electrodes 221 and each of the second electrodes 241. The first electrodes 221 and the second electrodes 241 may include a transparent conductive material such as indium tin oxide (ITO), indium-zinc-oxide (IZO), and indium-tin-zinc-oxide (ITZO).

Liquid crystal molecules LC may be initially arranged such that a major axis MA direction is parallel to one direction, for example, the x direction, as shown in FIG. 3. The first substrate 210 and the second substrate 250 may be further provided with an alignment layer (not shown) aligning liquid crystals.

FIG. 3 shows an electric field off mode in which no electric field is formed since no voltage is applied to the first electrodes 221 and the second electrodes 241. FIG. 4 shows an electric field on mode in which an electric field is formed since voltages are applied to the first electrodes 221 and the second electrodes 241.

The active prism 231 may be formed by a change in the arrangement of the liquid crystal molecules LC by the voltage applied between the first electrodes 221 and the second electrodes 241. A shape of the active prism 231 or an inclination of a prism surface of the active prism 231 may change according to the applied voltage. The active prism 231 may be formed since a refractive index in the major axis MA direction of the liquid crystal molecules LC is different from a refractive index in a minor axis direction perpendicular thereto. In other words, the liquid crystal molecules LC exhibit different refractive indices with respect to beams of polarization parallel to the major axis MA direction and beams of perpendicular to the major axis MA direction.

As shown in FIG. 3, in an initial arrangement state in which no voltage is applied between the first electrode layer 220 and the second electrode layer 240, the liquid crystal molecules LC may all be aligned in a direction parallel with each other, and a refractive index with respect to a beam of a certain polarization may be the same at any position.

As shown in FIG. 4, when a predetermined electric field distribution is formed in the liquid crystal layer 230 according to the voltage applied between the first electrode layer 220 and the second electrode layer 240, the liquid crystal molecules LC may be aligned depending on an electric field direction. In an example embodiment, in the liquid crystal molecules LC, the major axis MA direction may be arranged in an electric field direction when a dielectric anisotropy is positive (a positive type) and the major axis MA direction may be arranged in perpendicular to the electric field direction when the dielectric anisotropy is negative (a negative type). Different voltages may be applied to the first electrodes 221 constituting the first electrode layer 220 and a reference voltage may be applied to the second electrodes 241 constituting the second electrode layer 240. According to a voltage difference between the first electrodes 221 and the second electrodes 241, the liquid crystal molecules LC may be aligned in different directions. Since refractive indexes of the liquid crystal molecules LC are different from each other in the major axis MA direction and the minor axis direction, the liquid crystal layer 230 may have an index gradient according to the alignment of the liquid crystal molecules LC. A boundary surface may be formed in which the refractive index changes according to the index gradient in the liquid crystal layer 230. The active prism 231 may be formed by the boundary surface. A refraction of the incident beam may occur by the active prism 231 such that the beam may be deflected in a predetermined direction.

The inclination of the prism surface of the active prism 231 may be adjusted by changing the arrangement direction of the liquid crystal molecules LC according to the electric field distribution in the liquid crystal layer 230. The prism surface may represent a boundary surface at which a refractive index changes. In other words, a deflection direction of the incident beam may be adjusted according to the voltage applied between the first electrodes 221 and the second electrodes 241.

The active prism array 231A may be provided by periodically varying the voltage applied between the first electrodes 221 and the second electrodes 241. The active prism array 231A may include the active prisms 231 and the floating zones 232 between the neighboring ones of the active prisms 231. In an example embodiment, referring to FIG. 2, by applying first through eighth voltages V1, V2, V3, V4, V5, V6, V7, and V8 to the eight consecutive first electrodes 221, respectively, the floating zone 232 may be formed by turning off a voltage to the firstly positioned second electrode 241 among the second electrodes 241 corresponding thereto, and the active prism 231 may be formed by applying a reference voltage V0 to the other second electrodes 241. The active prism array 231A may be formed using the same method described above. The active prism 231 may vary according to a change in the voltage applied between the first electrodes 221 and the second electrodes 241.

Referring to FIG. 4, since a variation of a voltage difference between the first electrode 221 and the second electrode 241 at a right end of the active prism 231 in the figure and a voltage difference between the first electrode 221 and the second electrode 241 at a left end of the neighboring active prism 231 in the figure is large, an unwanted deformation of a prism surface may occur at a boundary between the neighboring active prisms 231. This is referred to as a fringe effect. When the prism surface is deformed as described above, a deflection direction of the beam may be adversely affected. The floating zone 232 may buffer the sudden change of an electric field at the boundary between the neighboring active prisms 231, thereby reducing deformation of the prism surface.

Figure 5:
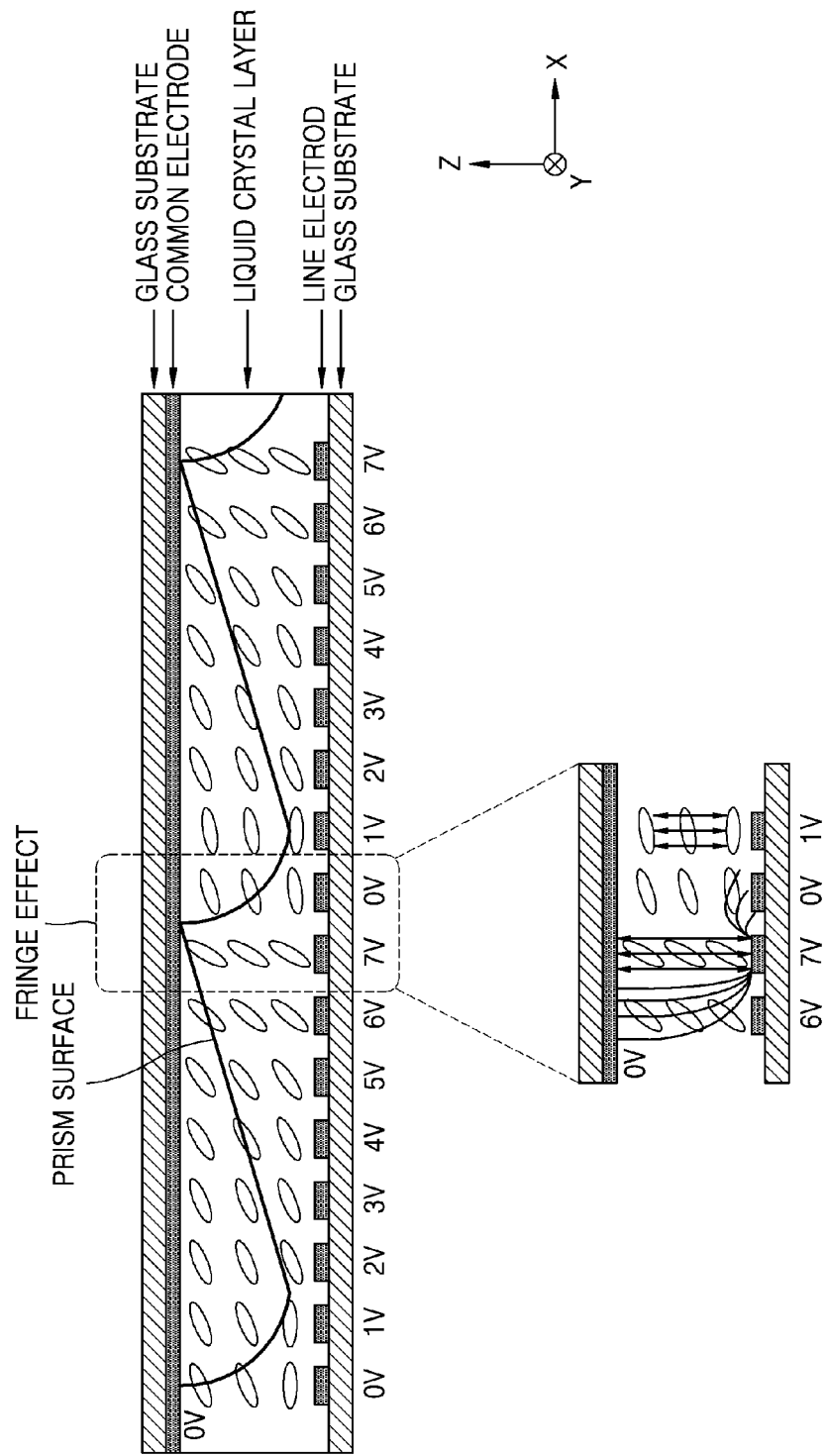
FIG. 5 shows a fringe effect that occurs in a beam deflector according to a comparative example.

FIG. 5 shows a comparative example including a first glass substrate, line electrodes spaced apart from each other, a liquid crystal layer, a common electrode, and a second glass substrate. A reference voltage may be applied to the common electrode, and 0V to 7V may be sequentially applied to the line electrodes, and voltages may be repeatedly applied in the same manner over the array of line electrodes. 7V and 0V may be respectively applied to neighboring line electrodes in a boundary region between neighboring active prisms. A prism surface may be deformed due to an influence of an electric field due to application of 7V in a 0V application region due to such abrupt voltage change.

Figure 6:
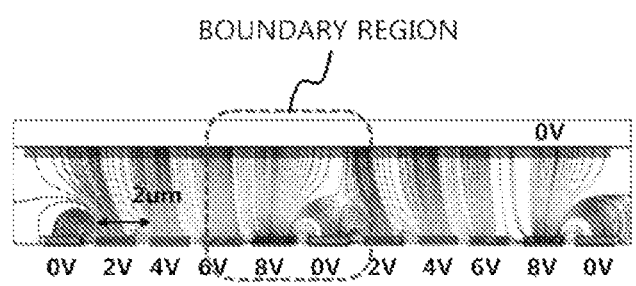
FIG. 6 shows an electric field in a boundary region between neighboring active prisms in a beam deflector according to an example embodiment.
Figure 7:
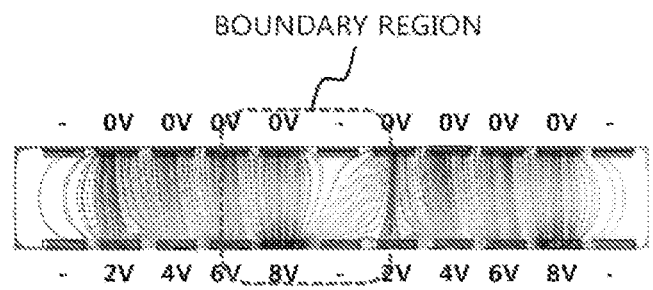
FIG. 7 shows an electric field in a boundary region between neighboring active prisms in a beam deflector according to the comparative example of FIG. 5.

FIG. 6 shows an electric field distribution in a boundary region between neighboring active prisms in a beam deflector according to an example embodiment. FIG. 7 shows an electric field distribution in a boundary region between neighboring active prisms in a beam deflector according to a comparative example. A variation of the electric field distribution in the boundary region between the neighboring active prisms in the beam deflector according to an example embodiment is not as large as compared with that of the comparative example. Therefore, a deformation of a prism surface of an active prism in the beam deflector according to an example embodiment may be reduced.

Figure 8:
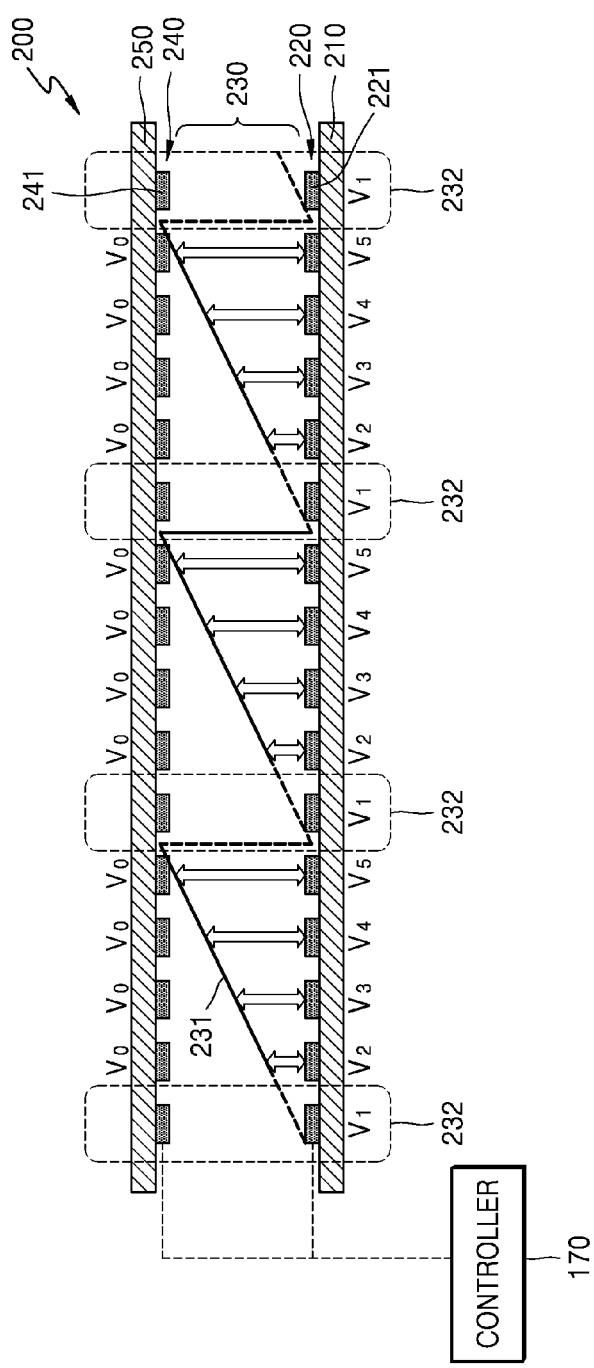
FIG. 8 shows a variation of an active prism of a beam deflector according to an example embodiment.

FIG. 8 shows a variation of the active prism 231 of a beam deflector according to an example embodiment. Regarding FIG. 2 according to an example embodiment, a voltage may be applied to eight consecutive electrodes in one period, whereas, regarding FIG. 8, a voltage may be applied to five consecutive electrodes in one period. The first to fifth voltages V1, V2, V3, V4 and V5 may be applied to the five consecutive electrodes and the reference voltage V0 may be applied to the four second electrodes 241 to form the active prism 231. Then, the floating zone 232 may be formed by turning off the voltage to the remaining one second electrode 241. In this regard, an example in which the floating zone 232 is formed by turning off the voltage to the second electrode 241 is described, but the floating zone 232 may also be formed by turning off the voltage to the first electrode 221. An active prism array may be provided by applying the voltage to the other first and second electrodes 221 and 241 in the same manner.

As described above, a deflection direction of a beam may be adjusted by converting the active prism 231. Also, a position of the floating zone 232 may be changed according to a change of the active prism 231. The controller 170 may turn off the voltage to at least one of the first electrode 221 and the second electrode 241 such that the floating zone 232 is provided in a boundary region between variable active prisms.

The controller 170 may control the active prism 231 to be formed by applying sequentially increasing or decreasing voltages to the n consecutive first electrodes 221 (n is a natural number) and the second electrodes 241 corresponding to the n consecutive first electrodes 221 and control the floating zone 232 to be formed by not applying a voltage to at least one of the (n+1)th first electrode and second electrode 221 and 241.

Figure 9:
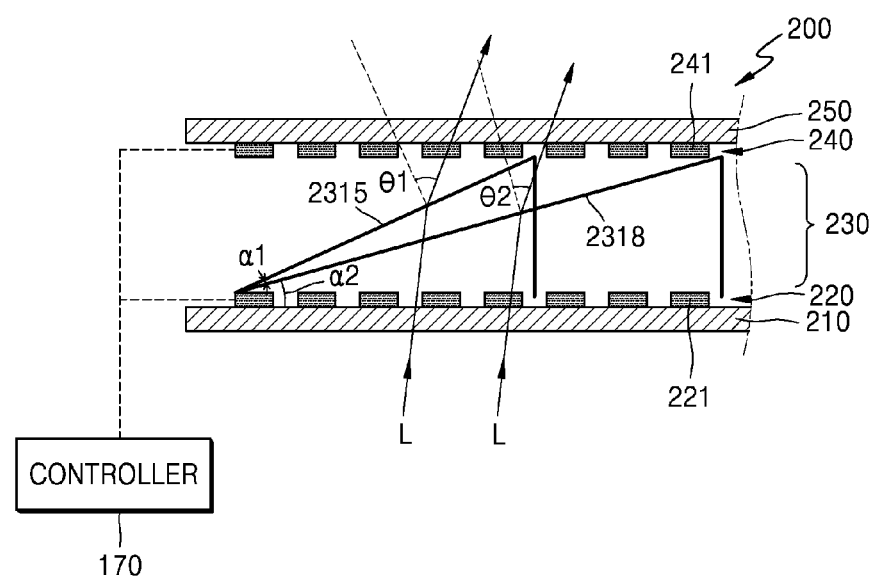
FIG. 9 shows a beam deflection of a beam deflector due to a varying active prism according to an example embodiment.

Referring to FIG. 9, a deflection direction of a beam may be changed according to an inclination of a prism surface of an active prism. The greater the number of the first electrodes 221 constituting one active prism, the smaller the inclination of the prism surface and the smaller the deflection angle. In an example embodiment, when the number of the first electrodes 221 constituting one active prism is 5, an inclination of a first prism surface 2315 is α1; when the number of the first electrodes 221 constituting one active prism is 8, an inclination of a second prism surface 2318 is α2; and α1>α2. When a beam L is incident on the active prism and is refracted by the first prism surface 2315 and the second prism surface 2318, an angle between the refracted beam and a normal line to the first prism surface 2315 is θ1, and an angle between the refracted beam and a normal line to the second prism surface 2318 is θ2, θ1>θ2. θ1 may be a deflection angle by the first prism surface 2315. θ2 may be a deflection angle by the second prism surface 2318.

When the number of the first electrodes 221 constituting one active prism is 5, a floating zone may be provided in a region corresponding to a 6n (n is a natural number) first electrode 221. When the number of first electrodes 221 constituting one active prism is 8, a floating zone may be provided in a region corresponding to an 8n (n is a natural number) first electrode 221. In this regard, the floating zone is provided in a region corresponding to one first electrode 221, but the number of the first electrodes 221 constituting the floating zone may be changed.

Referring to FIG. 9, when sequentially increasing voltages are applied to the n consecutive first electrodes 221, the prism surface of the active prism may have an inclined surface rising from a left side to a right side, as shown in a figure. In this case, the beam may be deflected in a right direction, as shown in a figure. When sequentially decreasing voltages are applied to the n consecutive first electrodes 221, the prism surface of the active prism may have an inclined surface rising from the right side to the left side, as shown in a figure. In this case, the beam may be deflected in a left direction, as shown in a figure.

Figure 10:
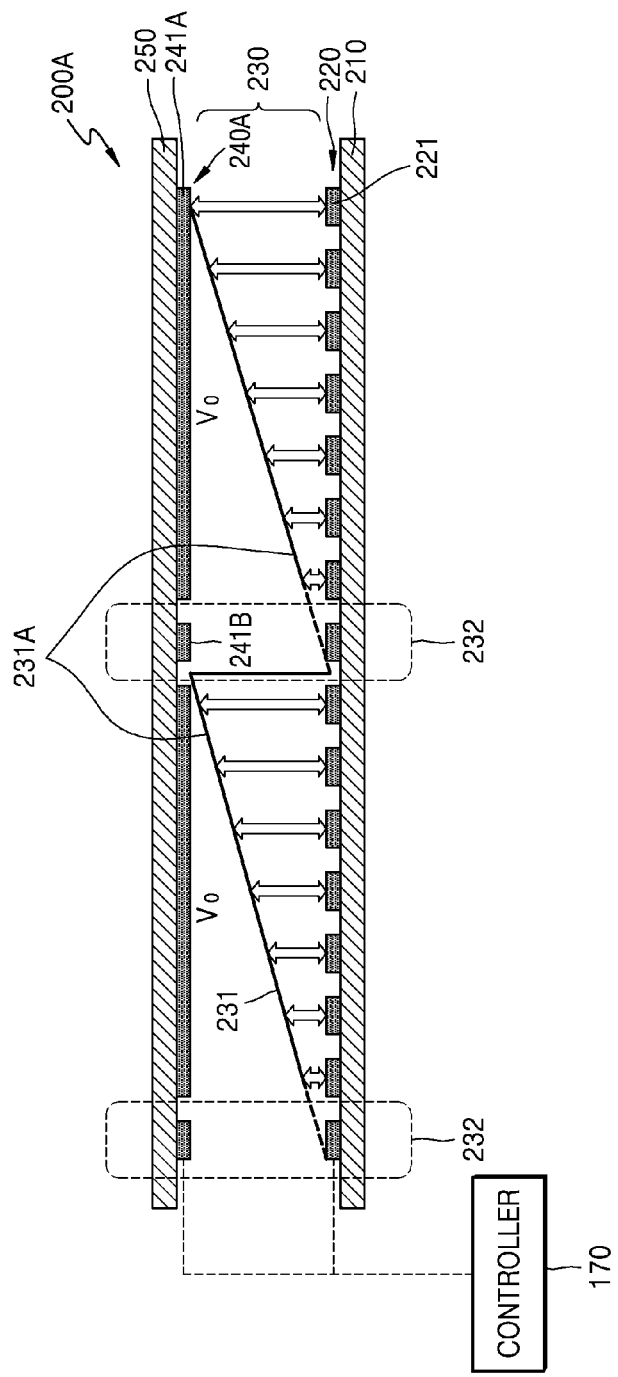
FIG. 10 shows a beam deflector according to another example embodiment.

FIG. 10 shows a beam deflector 200A according to another example embodiment.

The beam deflector 200A differs from the beam deflector 200 shown in FIG. 2 in a structure of a second electrode layer 240A and the remaining structures are the same. Therefore, detailed descriptions of the remaining components will be omitted. The first electrode layer 220 may include the first electrodes 221 spaced from each other. The second electrode layer 240A may include a common electrode 241A corresponding to the n, e.g. 7, first electrodes 221, and a floating electrode 241B spaced apart from the common electrode 241A.

The beam deflector 200A may deflect a beam at two time points. For example, the beam deflector 200a may deflect the beam at a first time point by an active prism formed when sequentially increasing voltages are applied to the n first electrodes 221, and may deflect the beam at a second time point by an active prism formed when sequentially decreasing voltages are applied to the n first electrodes 221.

Figure 11:
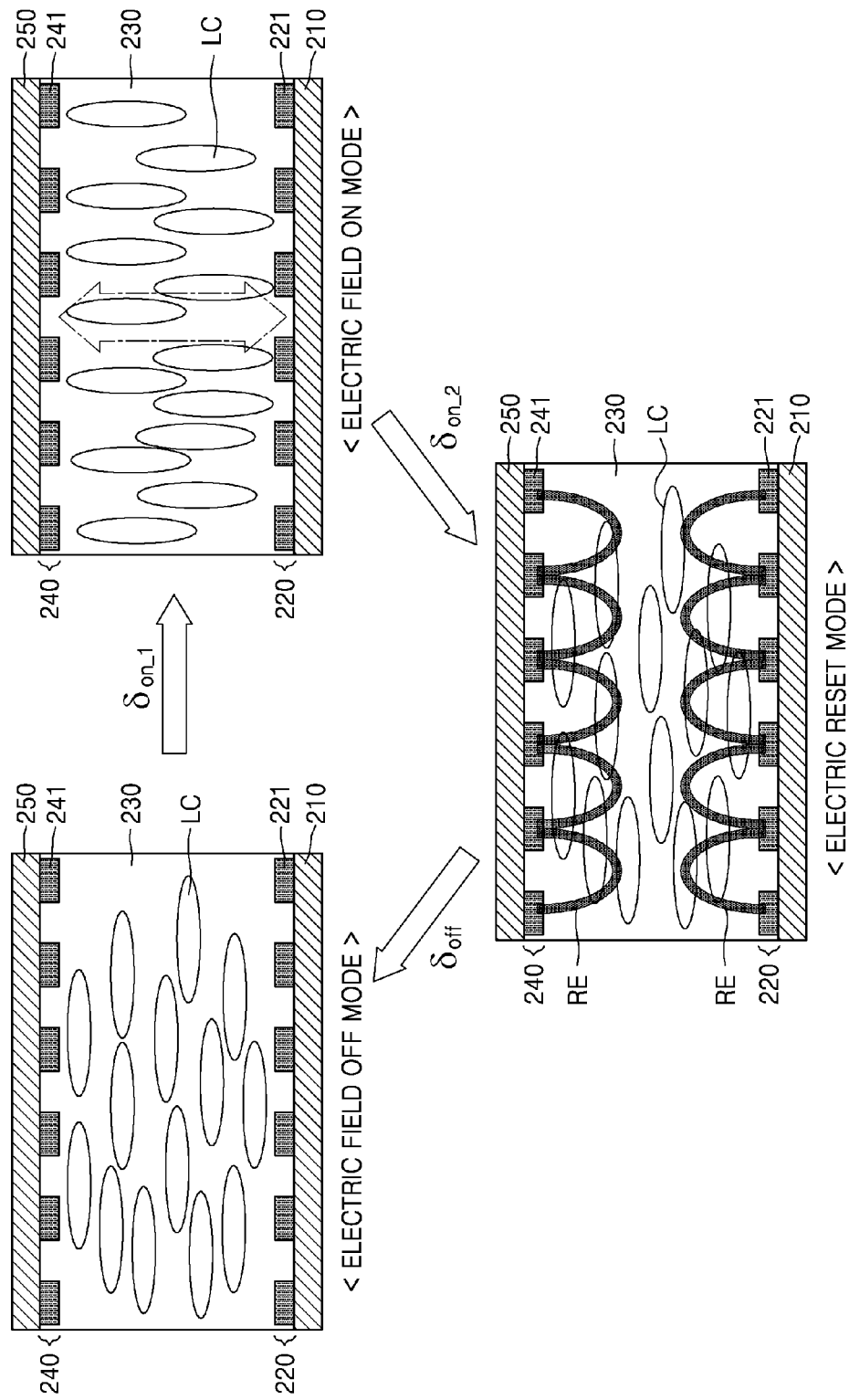
FIG. 11 is a diagram for explaining a method of driving a beam deflector according to an example embodiment.

FIG. 11 is a diagram for explaining a method of driving a beam deflector according to an example embodiment.

Referring to FIG. 11, the method of driving the beam deflector may include an electric field on mode $\delta_{on\_1}$ in which a voltage is applied to the beam deflector and an electric field off mode $\delta_{off}$ in which no voltage is applied. An electric field reset mode $\delta_{on\_2}$ may be provided between the electric field on mode $\delta_{on\_1}$ and the electric field off mode $\delta_{off}$. The electric field reset mode $\delta_{on\_2}$ may be introduced to reduce a liquid crystal response time of liquid crystal molecules when switching from the electric field on mode $\delta_{on\_1}$ to the electric field off mode $\delta_{off}$.

An inclination of a prism surface of the active prism may change for the beam deflector to adjust a beam deflection angle. To change the inclination of the prism surface of the active prism, the beam deflector may be switched from the electric field off mode $\delta_{off}$ to the electric field on mode $\delta_{on\_1}$, and accordingly orientations of the liquid crystal molecules LC may rotate.

Subsequently, before the beam deflector is converted into an active prism having a different beam deflection angle, the liquid crystal molecules LC may be reset to initial orientation of the liquid crystal molecules LC.

Before the deflection angle of the active prism is changed, the orientations of the liquid crystal molecules LC may be reset by an electric field formed between the neighboring first electrodes 221 in the first electrode layer 220. A reset may be a mode for returning the liquid crystal molecules LC to orientations corresponding to a state in which no electric field is formed between the first and second electrode layers 220 and 240. The orientations corresponding to the state in which no electric field is formed may be the orientations of the liquid crystal molecules LC horizontally parallel to the first electrode layer 220, i.e., the initial orientations in the electric field off mode $\delta_{off}$.

The beam deflector 200 may activate the electric field reset mode $\delta_{on\_2}$ to form a reset electric field for initializing the orientations of the liquid crystal molecules LC before operating in the electric filed off mode $\delta_{off}$.

In the electric field reset mode $\delta_{on\_2}$, a predetermined reference voltage may be applied to one neighboring first electrode 221 in the first substrate 210, and a first voltage different from the reference voltage may be applied to another first electrode 221. Also, the predetermined reference voltage may be applied to one neighboring second electrode 241 in the second electrode layer 240, and a second voltage different from the reference voltage may be applied to another second electrode 241.

Accordingly, a reset electric field RE based on a voltage difference may be formed between the neighboring first electrodes 221 and between the neighboring second electrodes 241. The reset electric field RE may be formed at an intensity equal to or close to an intensity of an electric field required for the liquid crystal molecules LC to be oriented perpendicular to the first electrode layer 220 and the second electrode layer 240.

The liquid crystal molecule orientation may be recovered (reset) in advance by the electric field reset mode $\delta_{on\_2}$ performed before the electric field off mode $\delta_{off}$, and thus the liquid crystal response time required for deflection angle conversion of the beam deflector 200 may be reduced.

Figure 12:
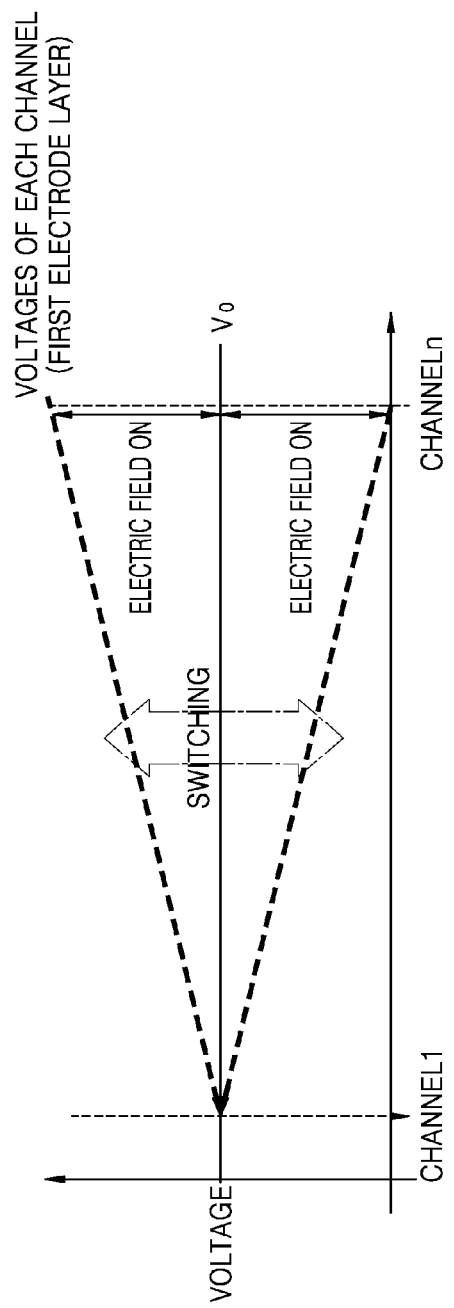
FIG. 12 shows driving voltages of a first electrode layer and a second electrode layer in an electric field on mode of a beam deflector according to an example embodiment.

FIG. 12 is a diagram for explaining voltages applied to the first electrodes 221 of the first electrode layer 220 and the second electrode 241 of the second electrode layer 240 for forming an active prism in an electric field on mode according to an example embodiment.

Referring to FIG. 11, the voltage applied to the first electrodes 221 of the first electrode layer 220 to form the active prism in the liquid crystal layer 230 in the beam deflector 200 is shown.

The reference voltage V0 may be applied to the second electrode 241 of the second electrode layer 240 and voltages having a gradually increasing magnitude may be applied respectively to the first electrodes 221 from a channel 1 to a channel n in the first electrode layer 220. Accordingly, the electric field may be formed to be stronger near the first electrode 221 of the channel n than near the first electrode 221 of the channel 1. Meanwhile, an electric field between the first electrode 221 and the second electrode 241 may be formed while being positively or negatively switched based on the voltage V0 of a reference electrode, which is to prevent curing of the liquid crystal molecules LC.

FIG. 11 relates to the voltages applied to the first electrodes 221 and the second electrodes 241 in the electric field on mode $\delta_{on\_1}$.

Figure 13:
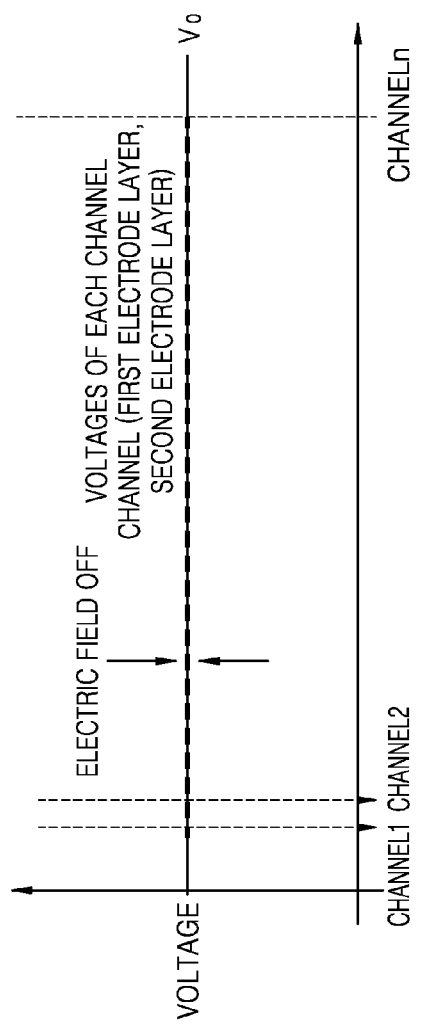
FIG. 13 shows driving voltages of a first electrode layer and a second electrode layer in an electric field off mode of a beam deflector according to an example embodiment.

FIG. 13 is a diagram for explaining voltages applied to the first electrodes 221 of the first electrode layer 220 and the second electrodes 241 of the second electrode layer 240 in an electric field off mode according to an example embodiment.

The reference voltage V0 may be applied to the first electrode 221 of the first electrode layer 220 and the second electrodes 241 of the second electrode layer 240 such that an electric field is not formed between the first electrodes 221 of the first electrode layer 220 and the second electrodes 241 of the second electrode layer 240.

Figure 14:
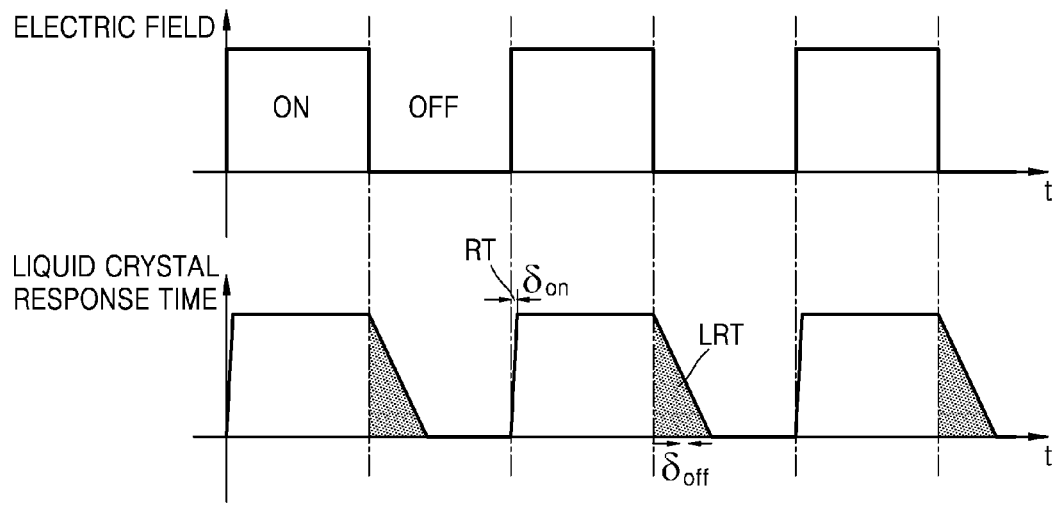
FIG. 14 shows an electric field over time and a liquid crystal response time over time when an active prism of a beam deflector changes without a reset mode.

FIG. 14 is a diagram for explaining a liquid crystal response time LRT according to switching between an electric field on mode $\delta_{on}$ and the electric field off mode $\delta_{off}$. When individual voltages described in FIG. 11 are applied to the first electrodes 221 of the first electrode layer 220 in the electric field on mode and then the reference voltage V0, described in FIG. 12, is applied to the first electrodes 221 in the electric field off mode, since a liquid crystal movement speed of liquid crystal molecules is slow, a relatively long liquid crystal response time LRT may be required. The liquid crystal response time LRT required for alignment setting of the liquid crystal molecules in the electric field off mode $\delta_{off}$ may be comparatively longer than the liquid crystal response time RT required for alignment setting of the liquid crystal molecules in the electric field on mode $\delta_{on}$. Such a phenomenon may affect an overall operating speed for a repetitive deflection angle conversion of the beam deflector 200.

Figure 15:
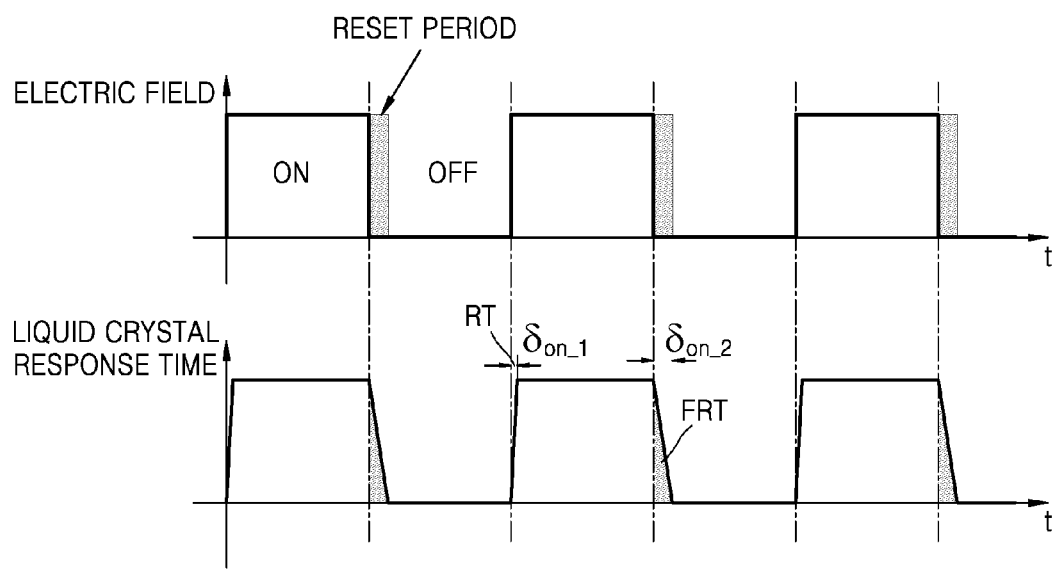
FIG. 15 shows an electric field over time and a liquid crystal response time over time when an active prism is converted according to a method of driving a beam deflector according to an example embodiment.

FIG. 15 is a diagram for explaining a change of the liquid crystal response time LRT according to the electric field reset mode $\delta_{on\_2}$ in a method of driving the beam deflector 200 according to an example embodiment. Referring to FIG. 15, when the electric field reset mode $\delta_{on\_2}$ is activated immediately after the electric field on mode $\delta_{on\_1}$ is completed, as compared with a graph of FIG. 14, the liquid crystal response time LRT for initializing liquid crystal molecules to a liquid crystal molecule orientation of the electric field off mode $\delta_{off}$ may be reduced. Accordingly, the beam deflector 200 may realize a faster conversion of a deflection angle, i.e., a faster response speed. In other words, a response time of liquid crystal molecules may be reduced by forcibly rotating an orientation of the liquid crystal molecules to an orientation when an electric field is not formed through a reset period.

Figure 16:
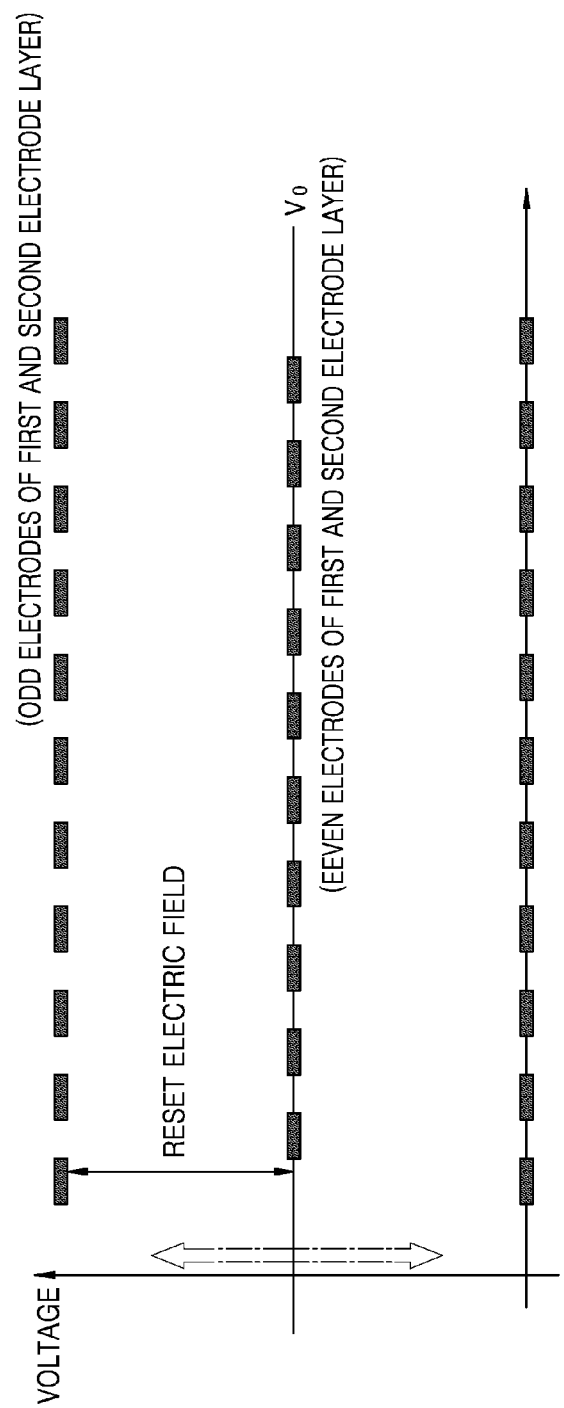
FIG. 16 shows voltages applied to a first electrode and a second electrode according to a method of driving a beam deflector according to an example embodiment.

FIG. 16 is a diagram for explaining voltages applied to the first electrode layer 220 and the second electrode layer 240 to form a reset electric field in the electric field reset mode $\delta_{on\_2}$ according to an example embodiment.

Referring to FIG. 16, the reset electric field may be formed between neighboring first electrodes in the first electrode layer 220 in the electric field reset mode $\delta_{on\_2}$. In this regard, the neighboring first electrodes may be two neighboring electrodes in the first electrode layer 220. Alternatively, the neighboring first electrodes may be two electrodes spaced apart from the first electrode layer 220 by a predetermined number.

For example, the reference voltage V0 may be applied to each of even-numbered first electrodes in the first electrode layer 220 and a first voltage different from the reference voltage V0 may be applied to each of odd-numbered first electrodes in the first electrode layer 220. Also, the reference voltage V0 may be applied to each of even-numbered second electrodes in the second electrode layer 240, and a second voltage different from the reference voltage V0 may be applied to each of odd-numbered second electrodes in the second electrode layer 240.

The reset electric field may be formed between neighboring odd-numbered first electrode and even-numbered first electrode. Also, the reset electric field may be formed between neighboring odd-numbered second electrode and even-numbered second electrode. Since the reset electric field is formed in both the first electrode layer 220 and the second electrode layer 240, liquid crystal alignment may be quickly reset.

The reset electric field may be formed while being switched to a positive or negative electric field to prevent curing of liquid crystal molecules. That is, referring to FIG. 16, when the reset electric field is formed, an operation of forming a positive electric field by applying a first voltage and a second voltage that are relatively high with respect to a reference voltage V0 and an operation of forming a negative electric field by applying a first voltage and a second voltage that are relatively low with respect to the reference voltage V0 may be alternately performed.

Although not shown in FIG. 16, a voltage for forming the reset electric field and the reference voltage may be applied to two electrodes spaced apart from each other by a predetermined number, other than neighboring odd-numbered electrodes and even-numbered electrodes.

It should be understood that the example embodiments described herein should be considered in a descriptive sense only and not for purposes of limitation. Descriptions of features or aspects within each embodiment should typically be considered as available for other similar features or aspects in other embodiments.

While one or more example embodiments have been described with reference to the figures, it will be understood by those of ordinary skill in the art that various changes in form and details may be made therein without departing from the spirit and scope as defined by the following claims.

What is claimed is:

1. A beam deflector comprising:
a first substrate;
a first electrode layer comprising a plurality of first electrodes disposed on the first substrate;
a second substrate facing the first substrate;
a second electrode layer comprising a plurality of second electrodes disposed on the second substrate, the plurality of second electrodes being arranged in a one-to-one manner with respect to the plurality of first electrodes;
a liquid crystal layer between the first substrate and the second substrate; and
a controller configured to cause active prisms to be formed in the liquid crystal layer by adjusting voltages applied between the plurality of first electrodes and the plurality second electrodes and to cause a floating zone to be formed between adjacent active prisms by turning off a voltage of at least one of the plurality of first electrodes and the plurality of second electrodes between the adjacent active prisms, wherein each of the plurality of first electrodes is configured to be driven independently and each of the plurality of second electrodes is configured to be driven independently, wherein a first voltage is independently applied to each of the plurality of first electrodes and a second voltage is independently applied to each of the plurality of second electrodes, wherein the floating zone is formed by independently turning off a voltage a first second electrode, among the plurality of second electrodes, and wherein an active prism is formed by independently applying a reference voltage to one or more second second electrode, among the plurality of second electrodes other than the first second electrode.

2. The beam deflector of claim 1, wherein the control unit is configured to apply sequentially increasing or decreasing voltages to n consecutive ones of the plurality of first electrodes and to apply a common reference voltage to n consecutive ones of the plurality of second electrodes corresponding to the n consecutive ones of the plurality of first electrodes.

3. The beam deflector of claim 2, wherein the control unit is configured to turn off a voltage of at least one of a first electrode positioned next to the n consecutive ones of the plurality of first electrodes and a second electrode positioned adjacent to the n consecutive ones of the plurality of second electrodes.

4. The beam deflector of claim 2, wherein the control unit is configured to control a deflection angle of a beam incident on the beam deflector by adjusting a number of the n consecutive ones of the plurality of first electrodes and a number of the n consecutive ones of the plurality of second electrodes.

5. The beam deflector of claim 1, wherein the plurality of first electrodes comprise line electrodes parallel to and spaced apart from each other, and wherein the plurality of second electrodes comprise line electrodes parallel to and spaced apart from each other.

6. The beam deflector of claim 1, wherein the controller is configured to reset an orientation of liquid crystal molecules of the liquid crystal layer by applying voltages between adjacent ones of the plurality of first electrodes in the first electrode layer and by applying a common reference voltage to the plurality of second electrodes of the second electrode layer.

7. The beam deflector of claim 1, wherein the controller is configured to reset an orientation of liquid crystal molecules of the liquid crystal layer by applying voltages between adjacent ones of the plurality of first electrodes in the first electrode layer and by applying voltages between adjacent ones of the plurality of second electrodes of the second electrode layer.

8. A holographic display device comprising:
a light source;
a beam deflector configured to deflect a beam received from the light source; and
a spatial light modulator configured to diffract the beam deflected by the beam deflector to form a hologram image,
wherein the beam deflector comprises:
a first substrate;
a first electrode layer comprising a plurality of first electrodes disposed on the first substrate;
a second substrate facing the first substrate;
a second electrode layer comprising a plurality of second electrodes disposed on the second substrate, the plurality of second electrodes being arranged in a one-to-one manner with respect to the plurality of first electrodes;
a liquid crystal layer between the first substrate and the second substrate; and
a controller configured to cause active prisms to be formed in the liquid crystal layer by adjusting voltages between the plurality of first electrodes and the plurality of second electrodes and to cause a floating zone to be formed between adjacent active prisms by turning off a voltage of at least one of the plurality of first electrodes and plurality of the second electrodes between the adjacent active prisms,
wherein each of the plurality of first electrodes is configured to be driven independently and each of the plurality of second electrodes is configured to be driven independently,
wherein a first voltage is independently applied to each of the plurality of first electrodes and a second voltage is independently applied to each of the plurality of second electrodes,
wherein the floating zone is formed by independently turning off a voltage a first second electrode, among the plurality of second electrodes, and
wherein an active prism is formed by independently applying a reference voltage to one or more second second electrode, among the plurality of second electrodes other than the first second electrode.

9. The holographic display device of claim 8, wherein the control unit is configured to apply sequentially increasing or decreasing voltages to n consecutive ones of the plurality of first electrodes and to apply a common reference voltage to n consecutive ones of the plurality of second electrodes corresponding to the n consecutive ones of the plurality of first electrodes.

10. The holographic display device of claim 9, wherein the control unit is configured to turn off a voltage of at least one of a first electrode positioned next to the n consecutive ones of the plurality of first electrodes and a second electrode positioned adjacent to the n consecutive ones of the plurality of second electrodes.

11. The holographic display device of claim 10, wherein the control unit is configured to control a deflection angle of a beam incident on the beam deflector by adjusting a number of the n consecutive ones of the plurality of first electrodes and a number of the n consecutive ones of the plurality of second electrodes.

12. The holographic display device of claim 8, wherein the plurality of first electrodes comprise line electrodes parallel to and spaced apart from each other, and wherein the plurality of second electrodes comprise line electrodes parallel to and spaced apart from each other.

13. The holographic display device of claim 8, wherein the controller is configured to reset an orientation of liquid crystal molecules of the liquid crystal layer by applying voltages between adjacent ones of the plurality of first electrodes in the first electrode layer and by applying a common reference voltage to the plurality of second electrodes of the second electrode layer.

14. The beam deflector of claim 8, wherein the controller is configured to reset an orientation of liquid crystal molecules of the liquid crystal layer by applying voltages between adjacent ones of the plurality of first electrodes in the first electrode layer and by applying voltages between neighboring second electrodes of the second electrode layer.

15. The beam deflector of claim 8, further comprising:
a position detection sensor configured to detect a position of a viewer viewing the hologram image.

* * * * *